R. J. SMITH.
GALVANIC BATTERY.
APPLICATION FILED DEC. 22, 1915.
1,338,465. Patented Apr. 27, 1920.
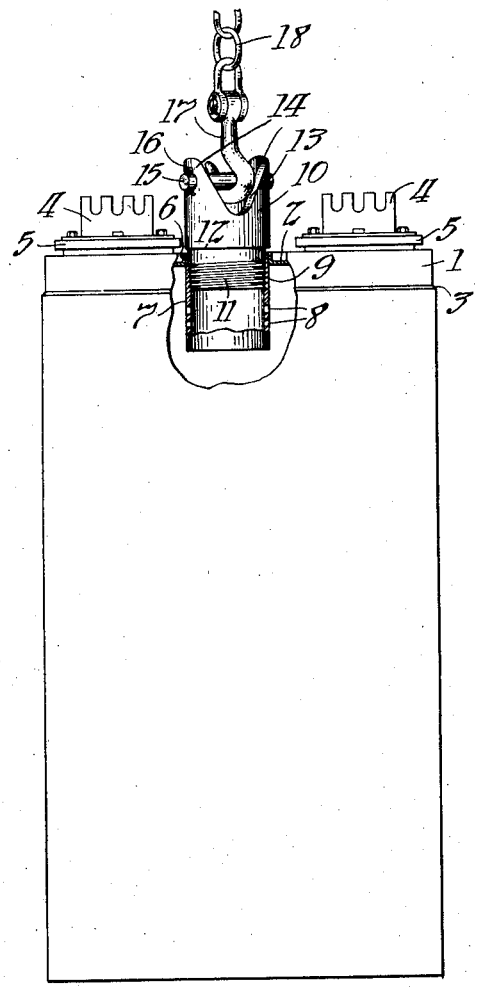
Witnesses:
Frank D Lewis
William A. Hardy.
Inventor:
Roscoe J. Smith
by Dyer and Holden
his Attys.

UNITED STATES PATENT OFFICE.

ROSCOE J. SMITH, OF NEWARK, NEW JERSEY, ASSIGNOR TO EDISON STORAGE BATTERY COMPANY, OF WEST ORANGE, NEW JERSEY, A CORPORATION OF NEW JERSEY.

GALVANIC BATTERY.

1,338,465.　　　　　Specification of Letters Patent.　　Patented Apr. 27, 1920.

Application filed December 22, 1915. Serial No. 68,127.

*To all whom it may concern:*

Be it known that I, ROSCOE J. SMITH, a citizen of the United States, and a resident of Newark, in the county of Essex and State of New Jersey, have invented certain new and useful Improvements in Galvanic Batteries, of which the following is a description.

My invention relates to galvanic batteries and more particularly to improved means for facilitating the lifting and handling of battery cells of considerable weight and size. While this invention is especially adapted for use with storage battery cells of the Edison type designed for submarine service, wherein the electrolyte and battery elements are disposed in a large strong metallic can or container, it is to be understood that my invention may also be effectively employed with battery cells of other types.

The principal object of my invention resides in the provision of very simple means whereby a battery cell of considerable weight may be conveniently and quickly moved and lifted without imposing undue strains on the cells, to thereby facilitate the assembling of any desired number of cells to form a battery, and the removal of a cell or cells from such a battery. My invention also contemplates a construction wherein a part of a battery cell may be quickly and readily replaced by the cell moving and lifting means and vice versa.

Other features of my invention reside in the construction of parts and combinations of elements hereinafter more fully described and claimed.

In order that my invention may be more clearly understood, attention is directed to the drawing accompanying and forming a part of this specification.

The single figure of the drawing is a view in side elevation, partly broken away and partly in section, showing an Edison storage battery cell of the submarine type equipped with the improved means for moving and lifting the same in accordance with my invention.

Referring to the drawing, reference character 1 represents the metallic can or receptacle of a storage battery cell, shown herein as a large cell of the Edison type designed for submarine service, and similar to that disclosed in the copending application of Charles W. Norton Serial No. 856,527 filed August 13, 1914, and entitled Secondary or storage batteries. Reference character 2 represents the top of the container or can which is welded to the side walls thereof slightly below the top of the can in the usual manner. The battery can is preferably made of strong cold rolled sheet steel, and is provided with an exterior coating 3 of semi-hard rubber vulcanized thereto, this coating covering the bottom of the can and the side walls thereof nearly to the top of the can. Reference characters 4, 4 represent the upper end portions of the positive and negative plates of the cell which form the poles or terminals of the cell and which extend above the top of the container through suitable stuffing boxes 5, 5. The top 2 of the battery can is provided between the stuffing boxes 5, 5 with a circular opening and with an upstanding flange 6 surrounding such opening. Reference character 7 represents a hollow cylindrical gas trap casing which extends into the battery can and is rigidly secured to the top 2 thereof within the opening above mentioned, preferably by being welded to the flange 6. The upper end of the casing 7 is preferably flush with the upper end of the flange 6. The casing 7 is interiorly threaded at 9, whereby a gas trap or safety device (not shown) which forms a part of the cell when the latter is complete, is adapted to be removably secured within the casing 9 by a member having threads for engagement with the threads 9. The purposes of this gas trap are to wash the gases given off by the cell, to prevent the explosions of gas which may occur within the cell from getting out, and also to prevent impurities and external flame from reaching the interior of the cell. The casing 7 is perforated as at 8 to provide communication between the interior of the cell and the gas trap or safety device.

Reference character 10 represents the lifting or moving device for the cell, which device is preferably in the form of a short cylindrical tube. The lower end portion of the lifting device is threaded, as shown at 11, and is slightly reduced in diameter so as to fit closely within the casing 7. The threaded portion 11 of the lifting device is in screw threaded engagement with the interiorly threaded portion 9 of casing 7, whereby the lifting device is removably but firmly secured to the cell. The shoulder 12 formed by the lower reduced portion of the lifting device, is adapted to coact with the upper end of the casing 7 to limit the engagement of these members.

The upper end portion of the lifting device is provided with a deep V-shaped recess 13, whereby the lifting device is provided at its upper end with spaced opposed portions 14. A rod or bar 15 is secured in a horizontal position in the opposed portions 14 of the lifting device adjacent the upper end thereof, as by means of cotter pins 16, only one of which pins is shown. The rod 15 is adapted to be engaged by a hook 17 carried by the chain 18 of a crane or the like, whereby the latter may serve to lift and move the cell to any desired position. By this construction, cells of great weight and size may be conveniently and readily handled without subjecting the same to undue strains and without injury to any of the parts thereof. When a cell equipped with my improved lifting device has been positioned as desired, the lifting device may be quickly and easily removed and replaced by the gas trap or safety device above mentioned.

While I have described the preferred embodiment of my invention, it is to be understood that the same is subject to various modifications without departing from the spirit of my invention and the scope of the appended claims.

Having now described my invention, what I claim as new and desire to protect by Letters Patent of the United States is as follows:—

1. In combination, a battery cell comprising a container, a hollow cylindrical member secured to the top of the container, said member having an internally threaded portion whereby the same is adapted to removably secure a safety device to the cell, and a lifting device for the cell having an exteriorly threaded portion in engagement with the threaded portion of said hollow member, said lifting device being replaceable by such safety device, substantially as described.

2. In combination, a battery cell comprising a container, a hollow cylindrical member secured to the top of the container and extending within the latter, said member having an internally threaded portion below said top whereby the same is adapted to removably secure a safety device for the cell within said container, and a lifting member for the cell having an exteriorly threaded portion in engagement with the threaded portion of said hollow member, said lifting member being replaceable by such safety device, and said members having coacting means for limiting the engagement thereof, substantially as described.

3. A lifting device for battery cells comprising a one-piece hollow member provided adjacent one end with means whereby it is adapted to be removably and rigidly secured to the container of a battery cell, said member being recessed at its other end whereby the same is formed with a pair of spaced opposed portions, and a rod adapted to be engaged by the lifting hook of a crane or the like mounted in said portions, substantially as described.

This specification signed and witnessed this 17th day of December, 1915.

ROSCOE J. SMITH.

Witnesses:
WILLIAM A. HARDY,
FREDERICK BACHMANN.